June 21, 1938.  C. G. BIRO  2,120,963
POWER MEAT BAND SAW
Filed May 21, 1937

Inventor
Carl G. Biro
By
Attorney

Patented June 21, 1938

2,120,963

UNITED STATES PATENT OFFICE 2,120,963

POWER MEAT BAND SAW

Carl G. Biro, Marblehead, Ohio

Application May 21, 1937, Serial No. 144,027

1 Claim. (Cl. 143—133)

My invention has for its object to provide a saw wherein pointed teeth are bent from the body of the saw to locate the points of the lateral surfaces of alternate teeth on opposite sides of the planes of the opposite lateral surfaces of the body of the saw blade whereby the outer lateral surfaces of the teeth form clearance surfaces with respect to the cutting edges of the saw.

My invention particularly has for its object to provide a band saw having pointed teeth, the teeth having leading edge surfaces, with reference to the direction of the movement of the band saw in performing its cutting operation, located in planes at right angles to the longitudinal axis of the saw and sloping following edge surfaces inclined to the plane of the leading edge surfaces and plane lateral surfaces extending from the base line of the teeth to the points of the teeth and whose outer edges between the said following sloping edge surfaces and the said lateral surfaces are disposed at a 6° angle extending from the lateral surfaces of the body of the saw to the leading edges of the teeth whereby cutting clearance is formed for each tooth and for the body of the blade by the removal of the minimum material. Surface friction is thus reduced to produce the minimum of temperature raise in the cutting of the meat.

The invention may be contained in saw structures used for different purposes and the parts of the saw may be varied in their details. To illustrate a practical application of the invention, I have selected a meat band saw as an example of saws containing the invention and shall describe the selected saw hereinafter. The particular saw selected is shown in the accompanying drawing and is described hereinafter.

Figure 1:
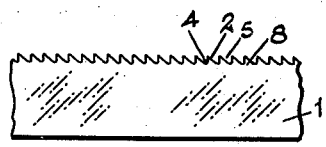
Figure 2:
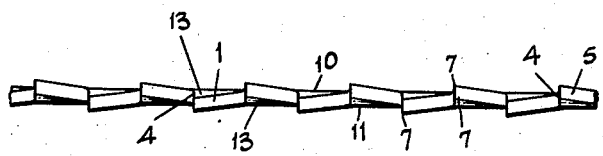
Figure 3:
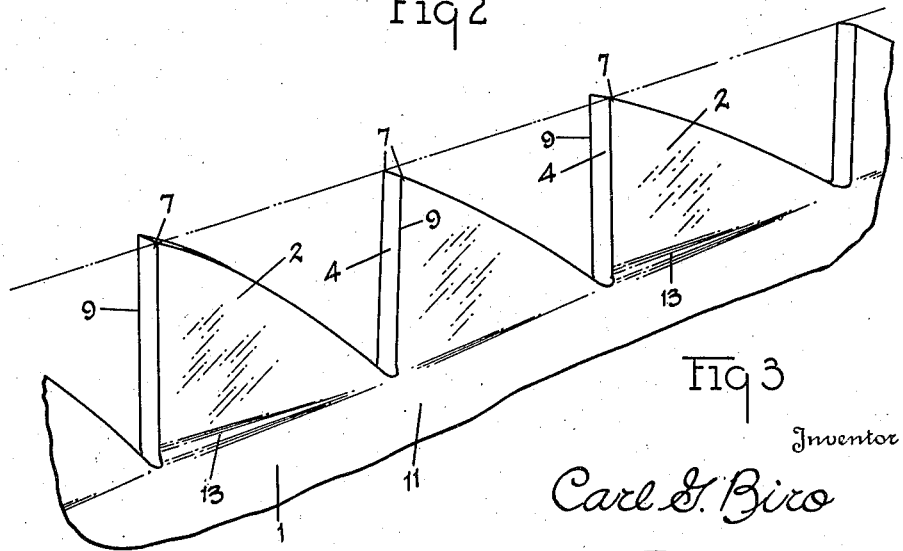

Fig. 1 illustrates a side view of the saw selected as illustrative of an embodiment of the invention. Fig. 2 is an enlarged edge view of the saw showing the positions of the teeth relative to each other and to the body of the saw blade. Fig. 3 illustrates a further enlarged perspective view of a tooth of the saw.

The saw 1 illustrated in the drawing comprises a blade usually in band form having teeth 2. Each tooth has a vertical leading edge surface 4 located in a plane extending at right angles to the longitudinal axis of the saw and an edge surface 5 located in a plane inclined to the longitudinal axis of the saw and to the leading edge surface 4. The corners of the saw formed by the edge surface parts and the lateral surfaces of the saw teeth form the saw points 7. The teeth are bent to form plane lateral surfaces 8 and to locate the said lateral surfaces of the teeth in planes that extend from the plane of the lateral surfaces 11 of the body of the saw toward the leading edge surfaces 4 of the teeth substantially at an angle of 6°, and form cutting edges 9 protruding from opposite sides of the body of the saw and surface clearances for each edge extending substantially from the base of each tooth to the point of the tooth. This produces an off-set part or ledge 13 at the base of each tooth. Each tooth is bent to dispose the points 7 on the opposite sides of the plane of one of the lateral surfaces of the body of the saw. The alternate teeth are bent angularly in opposite directions with respect to the lateral surfaces of the body of the saw, and the points of the lateral surfaces of each alternate tooth are disposed alternately on opposite sides of the lateral surfaces of the body of the saw.

In order to form a saw, particularly for sawing meat, the inner points 7 should be disposed with respect to the planes of the lateral surfaces of the body of the saw in alignment or overlapping relation with respect to the cutting movement of the saw blade to prevent the formation of ridges as the teeth pass over the material. By bending the teeth 6° the inner points are located in substantial alignment and a cutting clearance is formed for each tooth and for the body of the blade. It has been found that when ordinary power driven band saws are used, the meat surface temperature rises from 35° Fahrenheit to 90° Fahrenheit during ordinary saw cutting, while in the use of the saw invented by the applicant, in making a like cut under like conditions, the surface temperature of the meat rises from 35° to 45°.

I claim:

A saw, the teeth of the saw having their leading edge surfaces located in planes disposed at right angles to the longitudinal axis of the saw and other edge surfaces inclined to the said axis and forming edges with the lateral surfaces of the teeth, the teeth bent to form ledges at their bases and to locate the lateral surfaces of the teeth in planes extending substantially at a 6° angle with the planes of the lateral surfaces of the body of the saw and to locate edges of the first-named surfaces of the alternate teeth on opposite sides of the planes of the lateral surfaces of the body of the saw.

CARL G. BIRO.